United States Patent [19]

Takada

[11] Patent Number: 4,979,777
[45] Date of Patent: Dec. 25, 1990

[54] CHILD SAFETY SEAT FOR VEHICLES

[76] Inventor: Juichiro Takada, No. 12-1, Shinmachi, 3-chome, Setagaya-ku, Tokyo, Japan

[21] Appl. No.: 408,718

[22] Filed: Sep. 18, 1989

[30] Foreign Application Priority Data

Sep. 21, 1988 [JP] Japan ................... 63-234795

[51] Int. Cl.⁵ ..................... A47C 7/72; A47D 1/10
[52] U.S. Cl. ................... 297/250; 297/217
[58] Field of Search ............. 297/217, 250, 194

[56] References Cited

U.S. PATENT DOCUMENTS 3,948,379 4/1976 Warner ................. 297/217 X
4,310,307 1/1982 Bellisario ............. 297/217 X
4,790,593 12/1988 Davalos ................ 297/250

FOREIGN PATENT DOCUMENTS 2612396 9/1977 Fed. Rep. of Germany .
3331946 5/1984 Fed. Rep. of Germany ...... 297/194
1259088 3/1961 France ................. 297/217
2342188 10/1979 France .

Primary Examiner—Peter R. Brown
Attorney, Agent, or Firm—Brumbaugh, Graves, Donohue & Raymond

[57] ABSTRACT

A child safety seat for vehicles comprises a seat bottom, a seat back, and side portions including a lower torso restraint portion on each side of the seat bottom and a shoulder and head restraint portion on each side of the seat back. A shoulder and abdominal restraint system is associated with the seat bottom and seat back and is adapted to restrain a child in place on the seat. Sound generating apparatus is installed in the safety seat.

2 Claims, 4 Drawing Sheets

CHILD SAFETY SEAT FOR VEHICLES

DESCRIPTION

BACKGROUND OF THE INVENTION

Child safety seats are widely used, and in some jurisdictions are required by law to be used, to transport young children in automotive vehicles. The vehicle safety restraint belt systems for adults cannot be used to restrain children, and child safety seats are designed to be secured in place on the vehicle seats and are equipped with shoulder and abdominal restraint systems to restrain the child for protection in case of a collision or sudden stop. The child safety seat itself has a seat bottom, a seat back, a lower torso restraint portion on each side of the seat bottom and a shoulder and head restraint portion on each side of the seat back, all of which are well padded for the child's comfort and protection. An excellent example of a well-designed child safety seat is described and shown in the present inventor's U.S. Pat. No. 4,342,482, issued Aug. 3, 1982. Among the desirable attributes of that safety seat are the provision of an abdominal pad with an integrated buckle tongue, which is easy to use and provides excellent protection for the child, and an emergency locking retractor for the restraint belt, which allows the child to lean forward in the seat.

Children are notorious for their inability to sit still for even fairly short periods of time unless there is something to occupy them. They are even less tolerant of being restrained in one place. A child restrained in a safety seat will often try to stand up, extract himself from the seat, yell and scream or cry. If the child does not stay properly seated in the safety seat, the degree to which he or she will be protected in case of a collision or sudden stop is considerably reduced. Moreover, safe operation of the vehicle can be diminished by the distraction to the driver caused by a commotion put up by a restless or angry child. The driver may physically try to replace the child in a proper sitting position in the seat or may talk or yell at the child in an effort to quiet him or her. These activities draw the driver's attention away from driving and can result in an accident.

Children can become preoccupied and comforted by music or stories, and it can be helpful in quieting an unruly child to play tape cassettes of children's music, stories or other entertainment on the vehicle's cassette player. However, these entertainments are not very enjoyable for the adult occupants of the vehicles. After awhile, they can become just plain aggravating, in which case the attitudes of the child and the driver may even be reversed - the driver becomes angry and the child becomes content.

SUMMARY OF THE INVENTION

The principal object of the present invention is to provide a way of preoccupying, comforting and quieting a child seated in a child safety seat without aggravating, occupying, boring, or distracting other occupants of the vehicle. In preferred embodiments, another object is to provide an inducement to the restrained child to remain seated in the seat. The principal object is attained, according to the invention, by equipping a child safety seat with sound generating apparatus. Preferably, the apparatus has one or more sound emitters (speakers) located in the seat back or in one or both of the shoulder and head side restraints of the safety seat near one or both of the child's ears. As an optional but preferred characteristic, a detector is provided for detecting the presence or absence of a child in a seated position in the safety seat, and the apparatus is arranged so that the sound is generated when the child is seated and is not generated when the child is not seated. In this way, the child is induced to stay seated in order to keep hearing the sound.

The generating of the sound at the safety seat enables the sound level to be kept low and still be heard well by the child but not be heard by other occupants. Therefore, the child is kept happy and preoccupied, and the adult occupants are not bothered or bored by the child's entertainment. More importantly, the child is more likely to remain safely seated, the adults are not distracted by having to deal with an unruly child, and everyone is happier and safer.

For a better understanding of the invention, reference may be made to the following description of an exemplary embodiment, taken in conjunction with the accompanying drawings.

DESCRIPTION OF THE EMBODIMENT

Figure 1:
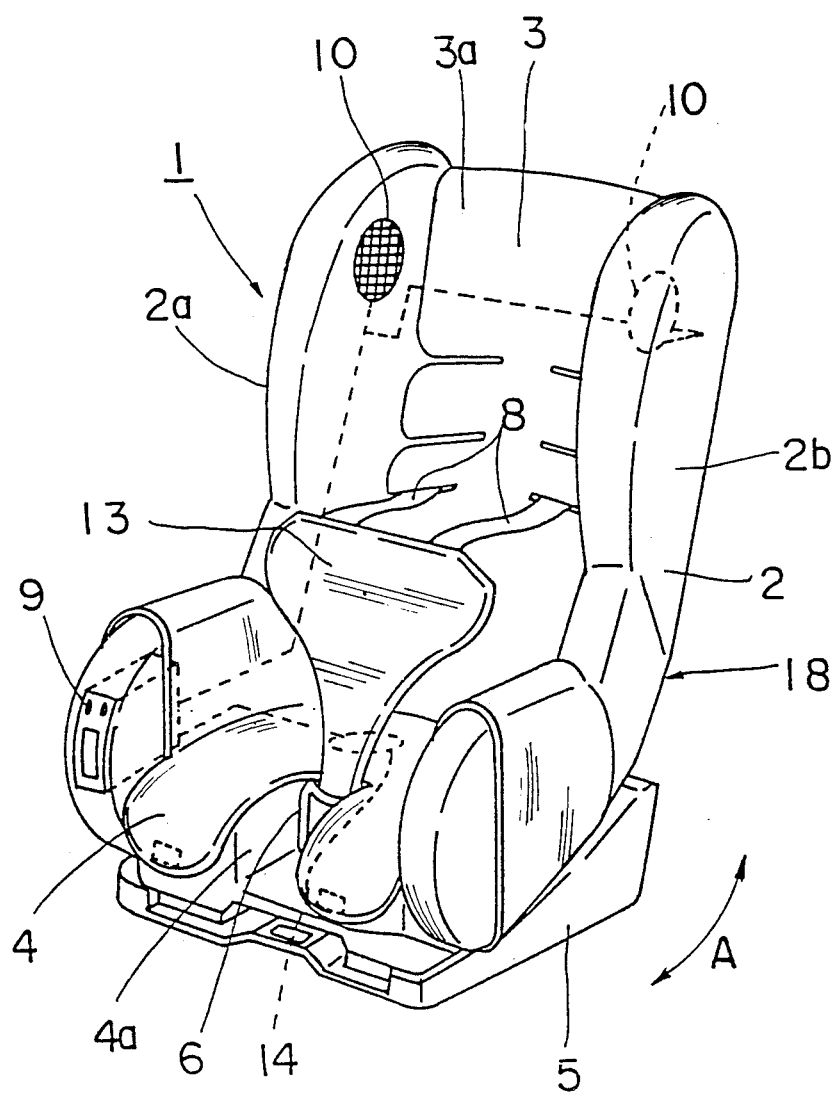
FIGS. 1 and 2 are, respectively, front and rear three-quarter pictorial views of the embodiment.

The child safety seat 1 in the embodiment consists of a base 5 and a seat 18 supported on the base 5 in a suitable and known manner such that it can be adjusted to two or more positions as indicated schematically by the arrowed line A in FIG. 1, including one in which the back is nearly upright and one in which the back is reclined. The base 5 and seat 18 are made by molding from a rigid polymeric material. The seat 5 is fitted with a pair of restraint belts 8 and an abdominal pad 13 for restraining a child placed in it.

The seat 18 includes a bottom 4, a back 3, and two side restraint portions 2, one 2a on one side and another 2b on the other side. The side restraint portions 2 border the bottom 4 and back 3 along their entire extents and restrain the upper legs, torso, shoulders and head of the occupant.

Figure 2:
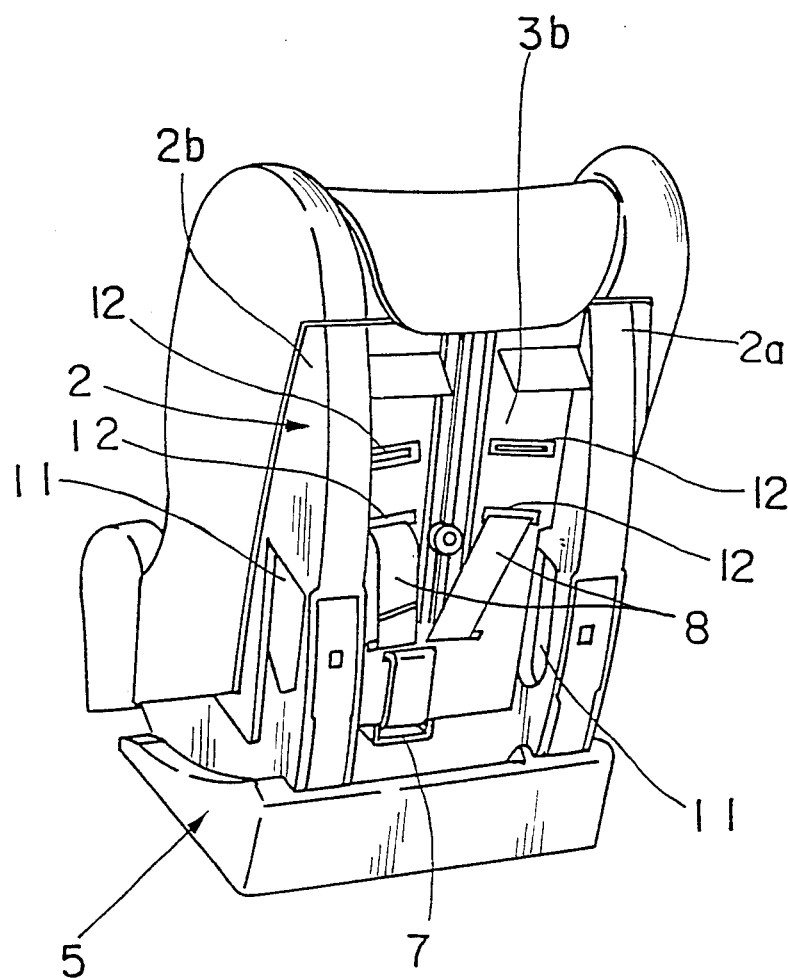

At the front and center of the seat bottom 4 is a recess 4a in which a buckle 6 is installed. The abdominal pad 13, which is of approximately triangular shape, has a buckle tongue extending from its lower edge that is releasably received by the buckle 6. As may be seen in FIG. 2, the respective belts 8 pass from the front surface 3a (FIG. 1) to the back surface 3b of the seat back 3 through one of a pair of upper and lower slots 12. Two or more pairs of slots 12 permit changing the heights of the belts 8 as the child grows. The belts lead down along the rear surface 3b of the seat back 3 to an emergency locking retractor 7. Openings 11 in the back of the child safety seat 18 receive the safety belt (not shown) of the vehicle in order to fasten the child safety seat in place on the vehicle seat. As described up to this point, the embodiment incorporates features that are well-known in the art.

Figure 3:
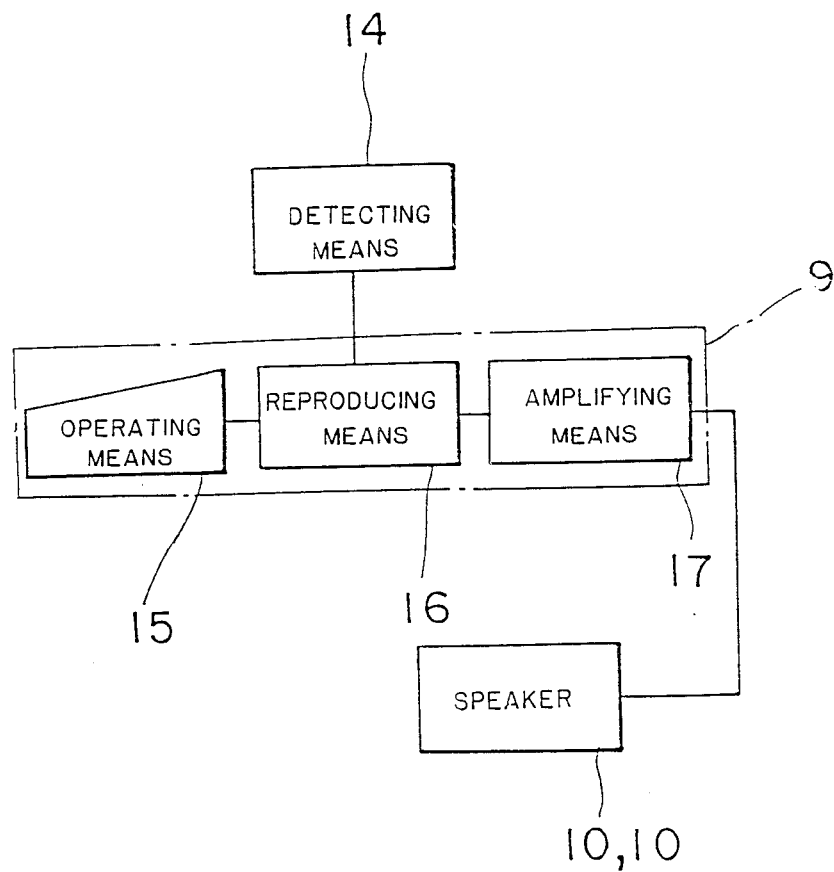
FIG. 3 is a block diagram of the sound generating apparatus of the embodiment.

According to the present invention, a child safety seat is fitted with sound generating apparatus, an example of which is shown schematically in FIG. 3. The example of the apparatus comprises: an operating means 15 for starting and stopping the production of sound; a reproducing means 16 for reproducing the sound recorded on a recording medium; an amplifying means 17 for amplifying the sound signals generated by the reproducing means; and one or more speakers 10 for generating sound waves from the amplified sound signals. Of course, a power source (not shown) is needed to operate the reproducing means 16 and amplifying means 17. The reproducing means 16 may be a compact disc, a cassette tape or a RAM (random access memory) device. It is also possible, of course, to provide a music box or a radio receiver as the reproducing means.

Figure 4:
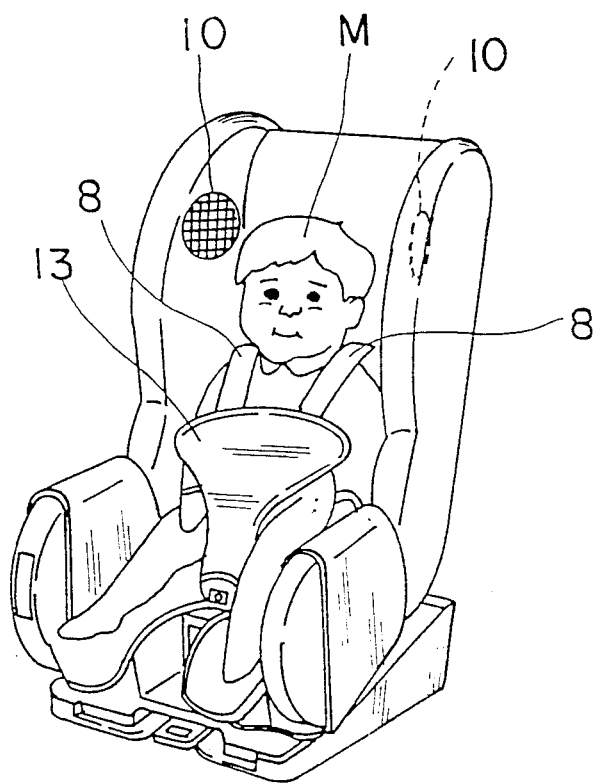
FIG. 4 is a front three-quarter pictorial showing the embodiment occupied by a content, properly seated child.

The sound producing apparatus, according to the embodiment, is built into the safety seat, as shown in FIG. 1. The operating means 15, reproducing means 16 and amplifying means 17 form a unit 9 (see FIG. 3) that is installed in one of the side portions 2. A speaker 10 is installed in the upper portion of each of the shoulder and head restraints 2a, 2b, which is a location close to the child's ears; alternatively, one or two speakers can be installed in the upper portion of the seat back 3. These locations for the speakers allow the sound level to be kept low so that while the child M sitting in the seat (see FIG. 4) can readily hear the sound, other occupants of the vehicle cannot, especially when the vehicle is moving and the sound from the speakers is masked by engine and road noise. Therefore, the passengers will not be disturbed by the noise of the child's sound producing apparatus.

The operating means 15 of the apparatus is composed of the conventional controls for the particular reproducing means 16; for example, in the case of a tape cassette player, the operating means may include play, fast forward and fast reverse, eject and stop controls.

While the sound producing apparatus may be started and stopped by a manual on-off switch controlled by the child M or another vehicle occupant, it is also advantageous to include in the apparatus a detecting means 14 for detecting the presence or absence of the child in the seat by, for example, sensing the pressure or force acting on the seat bottom when the child is sitting on the seat bottom. A suitable detecting means 14 is a force-actuated switch which opens when the force on it is low and closes when it is high. If the child is sitting on the seat bottom, the switch closes, thereby activating the reproducing means and causing sound to be produced. If the child leaves the seat, such as by trying to stand up, squirming about, or the like, the switch opens and stops the reproducing means 16. The child will quickly learn that the sound will be heard only when he or she is sitting on the seat bottom. The child will, therefore, be encouraged by the reward of hearing the sound to remain seated, and the safety of the child is increased. The child is, furthermore, preoccupied and entertained by the sound, which may be music, stories, or pulses of a heart, and will usually ignore his or her restrained situation and will not try to leave the seat or cry or scream. The detecting means 14 can be made as a modular element on a cord, which permits it to be placed under the seat bottom pad of the child safety seat or to be held and operated by the hand of a passenger, who may thereby control the sound production. Also, the operating means 15 may include a separate on-off switch for the reproducing means.

I claim:

1. A child safety seat for vehicles having a seat bottom, a seat back, and side portions including a lower torso restraint portion on each side of the seat bottom and a shoulder and head restraint portion on each side of the seat back, and a shoulder and abdominal restraint system associated with the seat bottom and seat back and adapted to restrain a child in place on the seat, characterized in that sound generating apparatus is installed in the safety seat, in that the sound generating apparatus includes a sound emitter installed in either the seat back or one of the shoulder and head restraints so as to be near the ear of a child sitting in the seat, and in that there are means associated with the seat for detecting the presence or absence of a child sitting in the seat and means associated with the detecting means for enabling sound to be generated by the sound generating apparatus when a child is sitting in the seat and preventing sound from being generated when a child is not sitting in the seat.

2. A child safety seat according to claim 1 and further characterized in that the sound generating apparatus further includes reproducing means for reproducing sound recorded on a recording medium and conductor means for conducting the sound from the reproducing means to the sound emitter.

* * * * *